US009551485B2

(12) United States Patent
Takayama et al.

(10) Patent No.: US 9,551,485 B2
(45) Date of Patent: Jan. 24, 2017

(54) METHOD FOR CONTROLLING NOX CONCENTRATION IN EXHAUST GAS IN COMBUSTION FACILITY USING PULVERIZED COAL

(75) Inventors: Yoshinori Takayama, Ibaraki (JP); Hirokazu Shima, Ibaraki (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 736 days.

(21) Appl. No.: 13/980,993

(22) PCT Filed: Jan. 16, 2012

(86) PCT No.: PCT/JP2012/000207
§ 371 (c)(1),
(2), (4) Date: Jul. 22, 2013

(87) PCT Pub. No.: WO2012/114645
PCT Pub. Date: Aug. 30, 2012

(65) Prior Publication Data
US 2013/0298809 A1 Nov. 14, 2013

(30) Foreign Application Priority Data

Feb. 25, 2011 (JP) .................. 2011-039879

(51) Int. Cl.
*F23C 1/00* (2006.01)
*C04B 7/36* (2006.01)
(Continued)

(52) U.S. Cl.
CPC ............... *F23C 1/00* (2013.01); *C04B 7/364* (2013.01); *C04B 7/4407* (2013.01); *F23K 1/00* (2013.01);
(Continued)

(58) Field of Classification Search
CPC ...... C04B 7/364; C04B 7/4407; F23J 2215/10; F23J 2219/20; F23K 1/00; F23K 2201/501; F23N 1/002; F23N 5/003; F23N 2021/10; F23C 1/00
See application file for complete search history.

(56) References Cited

U.S. PATENT DOCUMENTS 5,764,535 A 6/1998 Okazaki et al.
2009/0274985 A1* 11/2009 McKnight ............... F23C 6/045
431/36
2009/0277080 A1 11/2009 Day et al.

FOREIGN PATENT DOCUMENTS

JP 5 196212 8/1993
JP 7 310903 11/1995
(Continued)

OTHER PUBLICATIONS

International Search Report Issued Apr. 10, 2012 in PCT/JP12/000207 Filed Jan. 16, 2012.

*Primary Examiner* — Shogo Sasaki
(74) *Attorney, Agent, or Firm* — Oblon, McClelland, Maier & Neustadt, L.L.P.

(57) ABSTRACT

A method for controlling an NOx concentration in an exhaust gas in a combustion facility by: measuring a reaction velocity $k_i$ of each of a plurality of chars, each corresponding to a plurality of types of pulverized coals; determining a relationship between the NOx concentration in the exhaust gas and the reaction velocity $k_i$ for each of the chars; (iii) blending the plurality of the types of the pulverized coal, wherein a blending ratio of the plurality of the types of the pulverized coal is determined by using, as an index, a reaction velocity $k_{blend}$ of the char of the blended pulverized coal, which corresponds to a target NOx concentration or
(Continued)

below, on the basis of the relationship; and supplying the blended pulverized coal to the combustion facility as the fuel of the combustion facility.

1 Claim, 5 Drawing Sheets

(51) Int. Cl.
*C04B 7/44* (2006.01)
*F23K 1/00* (2006.01)
*F23N 1/00* (2006.01)
*F23N 5/00* (2006.01)

(52) U.S. Cl.
CPC ............... *F23N 1/002* (2013.01); *F23N 5/003* (2013.01); *F23J 2215/10* (2013.01); *F23J 2219/20* (2013.01); *F23K 2201/501* (2013.01); *F23N 2021/10* (2013.01)

(56) References Cited

FOREIGN PATENT DOCUMENTS

| JP | 9 133321 | 5/1997 |
|----|----------|--------|
| JP | 10 192896 | 7/1998 |
| JP | 10 194800 | 7/1998 |
| JP | 2007 139266 | 6/2007 |
| JP | 2009 109081 | 5/2009 |
| JP | 2010 500527 | 1/2010 |
| JP | 2010 96431 | 4/2010 |

* cited by examiner

METHOD FOR CONTROLLING NOX CONCENTRATION IN EXHAUST GAS IN COMBUSTION FACILITY USING PULVERIZED COAL

TECHNICAL FIELD

The present invention relates to a method for controlling an NOx concentration in an exhaust gas to be discharged from various combustion facilities which use a pulverized coal as a fuel.

BACKGROUND ART

Generally, in a calciner in a cement manufacturing process, a pulverized coal is used as a fuel for heating and calcining a cement material in the calciner.

As is illustrated in FIG. 3, the cement manufacturing facility provided with this calciner includes: a rotary kiln 1 for burning a cement material; a preheater 3 provided with a plurality of cyclones 4a to 4d which are provided on a kiln inlet part 2 of this rotary kiln 1 in the left side of the figure; a chute 5 for feeding the cement material from the cyclone 4d in the lowermost stage of this preheater 3 to the kiln inlet part 2 of the rotary kiln 1; an exhaust line 9 having an exhaust fan 10 which is connected to the cyclone 4a in the uppermost stage and discharges a combustion exhaust gas; a main burner 7 for heating the inner part of the rotary kiln, which is provided at a kiln outlet part 6 in a right side in the figure; a clinker cooler 8 for cooling a cement clinker that has been burnt, which is provided at the kiln outlet part 6; and further a calciner 12 having the lower end to which the combustion exhaust gas is introduced from the kiln inlet part 2 of the rotary kiln 1 through a duct portion and also having a combustion device of the pulverized coal provided therein which is fed from a not-shown fuel feed line, between the cyclone 4c in the third stage and the cyclone 4d in the fourth stage. For information, there is also a cement manufacturing facility having the calciner 12 provided in another path which is different from the duct portion on the kiln inlet part 2.

In a cement-clinker manufacturing facility having the above described structure, the above described cement material which has been fed to the cyclone 4a in the uppermost stage shall be preheated by a high-temperature exhaust gas which is sent from the rotary kiln 1 and ascends from the lower part, as the cement material falls down sequentially to the cyclones 4 in the lower part, then be extracted from the cyclone 4c, be sent to the calciner 12, be calcined in the calciner 12, and then be introduced into the kiln inlet part 2 of the rotary kiln 1 from the cyclone 4d in the lowermost stage through the chute 5.

On the other hand, the combustion exhaust gas which has been discharged from the rotary kiln 1 shall be sent to the cyclone 4d in the lowermost stage through the calciner 12, be sequentially sent to the cyclones 4 in the upper part to preheat the above described cement material, and finally be exhausted by the exhaust fan 10 from the upper part of the cyclone 4a in the uppermost stage through the exhaust line 9.

By the way, in such a cement manufacturing facility, the concentration of nitrogen oxides (hereinafter referred to as NOx) in the exhaust gas to be discharged from the exhaust line 9 by the exhaust fan 10 is regulated by the Air Pollution Control Law. For this reason, the cement manufacturing facility monitors the NOx concentration in the combustion exhaust gas at all times and controls the NOx concentration in the exhaust gas so that the concentration does not exceed the above described regulation value, by removing the NOx by appropriately spraying ammonia water, sludge containing ammonia water or the like into the exhaust line 9, or by lowering the temperature in the rotary kiln 1 by adjusting the amount of fuel of the main burner 7, as are described in the following Patent Literatures 1 and 2, and the like.

CITATION LIST

Patent Literature
Patent Literature 1: Japanese Patent Laid-Open No. H10-194800
Patent Literature 2: Japanese Patent Laid-Open No. H10-192896
Patent Literature 3: Japanese Patent Laid-Open No. H05-196212
Patent Literature 4: Japanese Patent Laid-Open No. H07-310903

SUMMARY OF INVENTION

Problems to be Solved

For this reason, when the NOx concentration in the above described exhaust gas becomes high, the amount of the sprayed ammonia water, sludge or the like is increased, and a white smoke and a foreign odor might occur. In addition, when the temperature in the rotary kiln 1 is excessively lowered by the adjustment for the amount of the fuel of the main burner 7, a quantity of heat necessary for burning the cement material decreases, and such an operation problem might occur as the deterioration of the quality and the reduction in a quantity of production.

On the other hand, it is known that the NOx generated by the combustion of fuel is divided roughly into NOx (Thermal-NOx) originating in heat, and NOx (Fuel-NOx) originating in fuel.

Then, in order to solve the above described conventional problems, as for the NOx originating in the heat, it is investigated to use a low-NOx burner or the like, as is proposed in the above described Patent Literatures 3 and 4.

In addition, as for the NOx originating in the fuel, attention is paid to a nitrogen mass ratio in the fuel or a fuel ratio (=fixed carbon ratio/volatile component ratio), and a method is adopted which lowers the NOx concentration by using a fuel having a lower nitrogen mass ratio or by increasing a combustion speed with the use of a fuel having a small fuel ratio (having large ratio of volatile components). However, any method has such problems that estimation accuracy is low and accordingly it is difficult to control the NOx concentration into a desired NOx concentration range in the operation. Then, it has been expected to improve the problems.

Then, the present inventors have made the following examination and study in order to control the NOx concentration in the exhaust gas which is discharged particularly from the above described calcining furnace 12, with high accuracy.

Firstly, a process in the above described calciner 12 which uses the pulverized coal as the fuel is a process of calcining the cement material, and a temperature in the calciner is 800 to 900° C. Accordingly, it is considered that the NOx in the exhaust gas to be discharged from the calciner 12 is mainly NOx originating in the fuel.

Then, the present inventors measured properties (nitrogen mass ratio, fuel ratio and reaction velocity of char (fixed carbon)) of each of pulverized coals with respect to a plurality of types of pulverized coals which were used in the above described calciner 12, and also measured the NOx concentration in the exhaust gas which was discharged from the above described calcining furnace 12 in the case where a substance obtained by blending the above described pulverized coals was actually used as fuel. Subsequently, the present inventors calculated the properties (nitrogen mass ratio, fuel ratio and reaction velocity of char (fixed carbon)) of the pulverized coal which was actually used as the fuel, on the basis of the above described blend ratio, and examined an influence of these properties on a change of the NOx concentration in the above described exhaust gas.

As a result, as illustrated in FIG. 4A, a determinate correlationship could not be found between a nitrogen mass ratio (N wt. %) in the used pulverized coal and the value of the NOx concentration in the exhaust gas in the outlet of the calciner. In addition, similarly, a significant correlationship could not be found also between the fuel ratio and the value of the NOx concentration in the exhaust gas in the outlet of the calciner, as illustrated in FIG. 4B.

From these results, it was found difficult to expect the desired decrease of the NOx concentration or to control the NOx concentration with such an accuracy as to be necessary in the operation, by only using a fuel having a low nitrogen mass ratio or using a fuel having a small fuel ratio, as in the above described conventional technology.

Then, the present inventors estimated or measured the reaction velocity of the char on the basis of the blend ratio of the above described pulverized coals, and compared the estimated or measured reaction velocity to the change of the NOx concentration in the exhaust gas in the outlet of the calcining furnace. As a result, a stronger correlationship was found between the reaction velocity and the change of the NOx concentration than that between the above described nitrogen mass ratio and the change of the NOx concentration or that between the fuel ratio and the change of the NOx concentration, and specifically such a tendency was found that the NOx concentration in the exhaust gas in the outlet of the calciner decreased as the reaction velocity of the char is high (FIG. 5).

The present invention has been designed on the basis of the above described finding, and an object of the present invention is to provide a method for controlling an NOx concentration in an exhaust gas in a combustion facility using pulverized coal, which can easily control the NOx concentration in the exhaust gas to be discharged from the combustion facility that uses the pulverized coal as the fuel, to or below a regulation value according to the Air Pollution Control Law and the like, and can also reduce an amount of a denitrifying agent or the like to be used, which is necessary for the control, by controlling the NOx concentration on the basis of the properties of the pulverized coal beforehand.

Means to Solve the Problems

In order to solve the above described problems, a method for controlling an NOx concentration in an exhaust gas to be discharged from a combustion facility that uses a pulverized coal as fuel, which is described in claim 1, includes: measuring a reaction velocity of each of chars corresponding to a plurality of types of pulverized coals beforehand; determining a relationship between the NOx concentration in the exhaust gas and the reaction velocity in advance; also blending the plurality of the types of the pulverized coals so that the reaction velocity of the char becomes such a value as to correspond to a target NOx concentration or below, on the basis of the relationship; and supplying the blended pulverized coal to the combustion facility as the fuel of the combustion facility.

In addition, the invention according to claim 2 includes using a frequency factor of the reaction velocity in place of the reaction velocity of the char, in the invention according to claim 1.

Furthermore, the invention according to claim 3 is the method in the invention according to claim 2, wherein the frequency factor of reaction of char is determined by: drawing a curve of a time change of weight loss for the plurality of the types of the pulverized coals under the condition of a plurality of temperatures by using a thermal balance; dividing the inclination of a tangent of the curve by a measured partial pressure of oxygen; thereby determining the reaction velocity of the char in the temperature; and subsequently drawing the Arrhenius plot which sets (1/measurement temperature (unit: absolute temperature)) for the horizontal axis and sets the value of the reaction velocity of the char in the measurement temperature for the vertical axis; and determining the frequency factor of the reaction of the char from an intercept of the vertical axis of the Arrhenius plot.

Advantageous Effects of Invention

As is clear from the experimental result by the present inventors, which will be described later, the method according to the invention described in any one of claims 1 to 3 can easily control the NOx concentration in the exhaust gas to be discharged from the combustion facility, to or below a regulation value according to the Air Pollution Control Law and the like, by measuring the reaction velocity of each of the chars corresponding to a plurality of types of pulverized coals which are used in a combustion facility beforehand, measuring the NOx concentration in the exhaust gas corresponding to the used pulverized coal in advance, and setting the value of the reaction velocity of the char so that the NOx concentration becomes a target value or below, on the basis of these relationships, when the plurality of the types of the pulverized coals are blended.

In addition, even when the value of the reaction velocity of the above described char cannot be controlled so that the NOx concentration in the exhaust gas becomes the target NOx concentration or below, only by the above described blend of the pulverized coal, the method according to the present invention can more greatly reduce the amount of the denitrifying agent or the like to be used, which is separately added for reducing the NOx concentration, than a conventional method, by decreasing the NOx value as much as possible by the adjustment of the reaction velocity, and accordingly can reduce also the occurrence of an operational harmful effect originating in the addition of the denitrifying agent or the like.

Incidentally, the reaction velocity k (1/s·Pa) of the char of the above described pulverized coal can be expressed by the following expression (1).

$$k = A \cdot \exp(-E/RT) \quad (1)$$

Here, "A" represents a reaction frequency factor (1/s·Pa) of char, "E" represents an activation energy (J/mol), "R" represents a gas constant (8,314 J/K·mol), and "T" represents an absolute temperature (K).

Accordingly, the reaction velocity k of char itself is a function of a temperature T. Accordingly, in order to control the NOx concentration in the exhaust gas on the basis of the reaction velocity k of char of each pulverized coal, it is necessary to consider also the factor of the temperature T, which makes the operation complicated.

Then, the present inventors drew the Arrhenius plot which sets the measurement temperature for the horizontal axis and sets the above described reaction velocity k of char in the measurement temperature for the vertical axis when having measured the above described reaction velocity k of char by using a thermal balance, determined the above described activation energy E from the inclination of the Arrhenius plot, and determined the above described reaction frequency factor A of char from the intercept of the above described vertical axis. As a result, it was found that the above described activation energy E could be considered to be a constant value (inclination was constant) in each of the pulverized coals and the difference among those was within 10%.

As a result, as illustrated in FIG. 5, it was proved that there was also a similar strong correlationship between the change of the reaction frequency factor A of char and the change of the NOx concentration in the exhaust gas.

Accordingly, when the NOx concentration is controlled with the use of the above described reaction frequency factor A of char as a representative value of the properties of the pulverized coal, in place of the above described reaction velocity k of char, as in the invention according to claim 2, it is not necessary to consider the influence of the temperature in the calciner when the pulverized coal is used therein, which accordingly further facilitates the control of the pulverized coal and the combustion control.

EMBODIMENTS OF THE INVENTION

Figure 3:
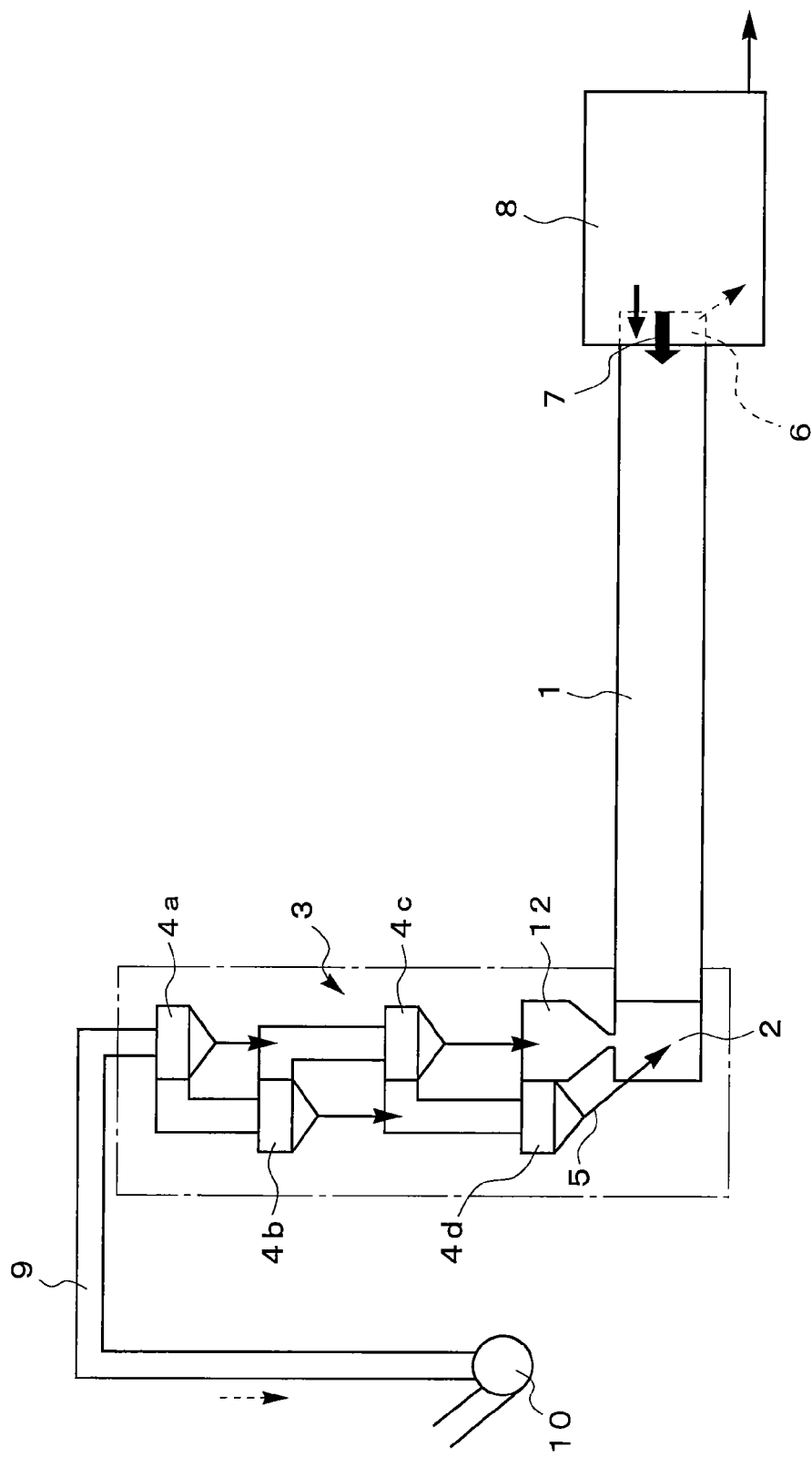
FIG. 3 is a schematic block diagram illustrating a cement manufacturing facility to which the above described embodiment has been applied.
Figure 4A:
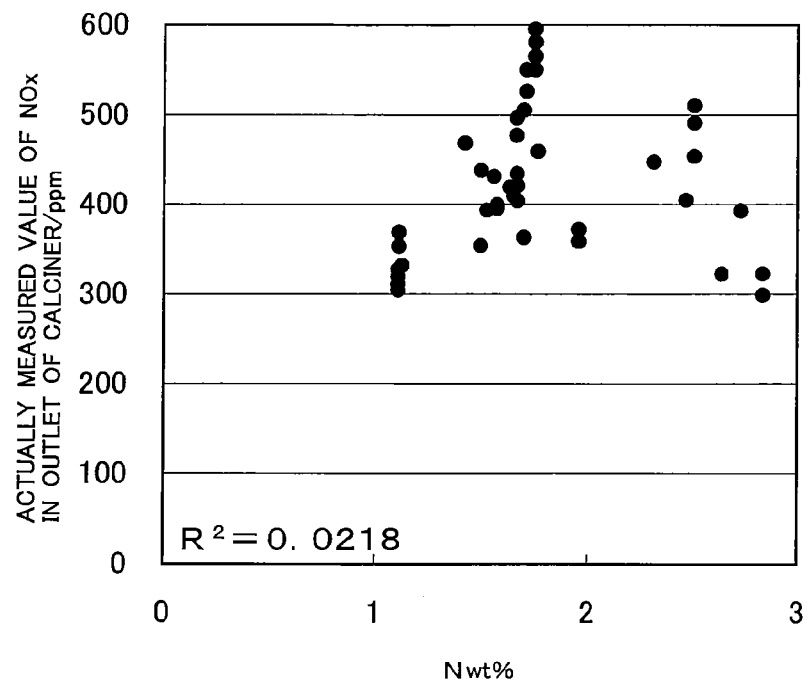
FIG. 4A is a graph illustrating a relationship between a nitrogen mass ratio of the pulverized coal and an NOx concentration in an exhaust gas.
Figure 4B:
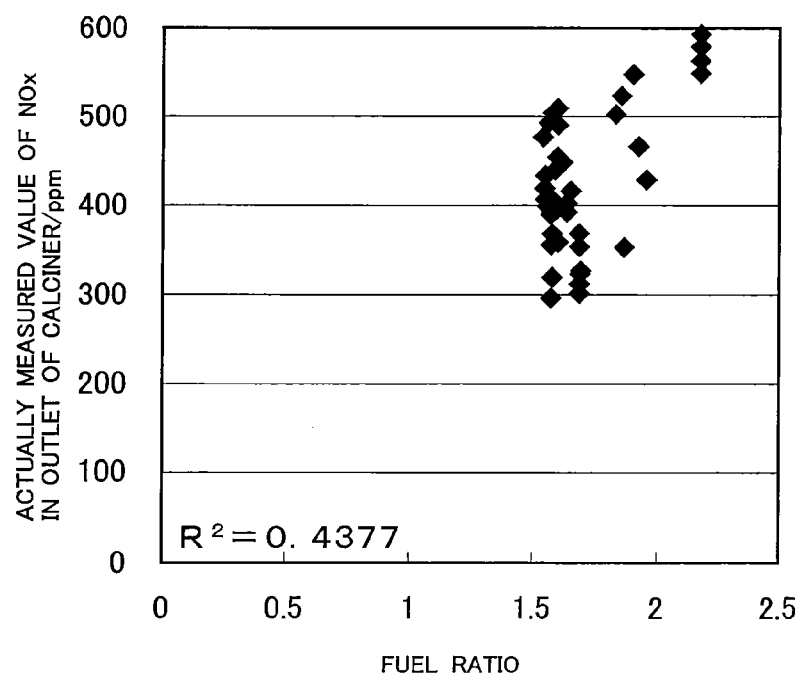
FIG. 4B is a graph illustrating a relationship between a fuel ratio of the pulverized coal and the NOx concentration in the exhaust gas.

One embodiment will be described below in which a method according to the present invention for controlling an NOx concentration in an exhaust gas in a combustion facility using pulverized coal, on the basis of an experimental example that has been conducted by the present inventors, has been applied to the control of the concentration of NOx originating in the combustion of the pulverized coal in a calciner 12 in the cement manufacturing facility illustrated in FIG. 3.

Figure 1:
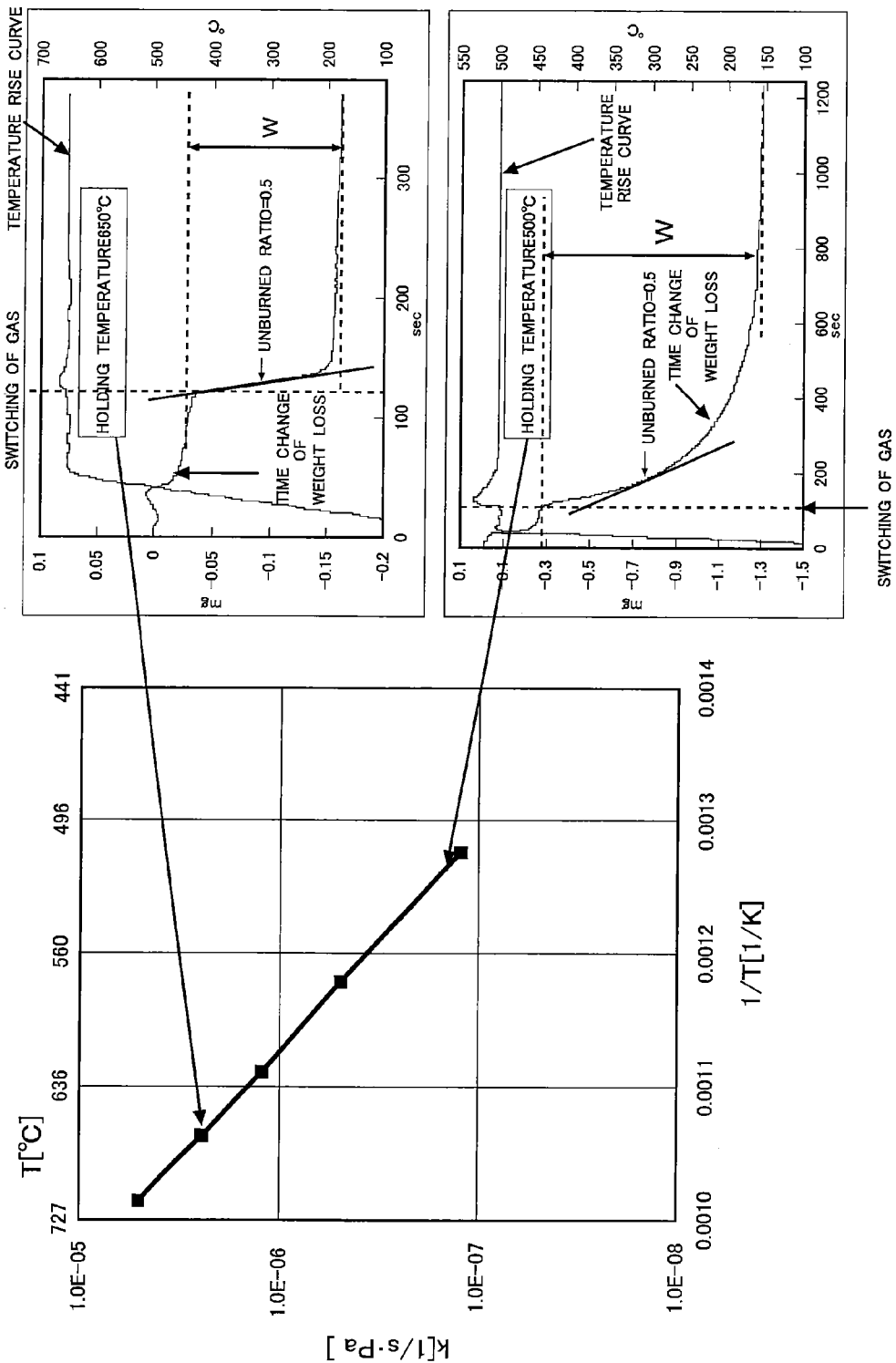
FIG. 1 is a graph schematically illustrating a method of measuring a reaction velocity of char and determining a reaction frequency factor of char from the Arrhenius plot which has been drawn on the basis of the result of the measurement, in one embodiment of the present invention.

Firstly, as illustrated in FIG. 1, a reaction velocity k of char corresponding to each of a plurality of types of pulverized coals which were used in the above described calciner 12 was measured with the use of a thermal balance.

Incidentally, the used thermal balance is an infrared differential type differential thermal balance TG8120 made by Rigaku Corporation, and a weight of a sample was measured with an electronic balance XS105DU made by Mettler-Toledo International Inc. In addition, a powder was used of which the 50% cumulative diameter was 10 to 40 μm when measured with a laser diffraction method, as the sample which were used for the evaluation of combustion properties.

The mass reductions of samples were measured according to a process of: raising the temperature of a predetermined amount of the sample of the pulverized coal in an atmosphere of nitrogen gas at a rate of 15 K/s; after the temperature has reached a predetermined temperature, holding the temperature until the change of the weight loss due to the thermal decomposition of a volatile component contained in the above described sample became sufficiently small (for 1 to 4 minutes); then switching the atmosphere of nitrogen gas to an atmosphere containing oxygen; and holding the sample at a plurality of constant temperatures (K).

Incidentally, the plurality of the constant temperatures and the amounts of the samples when the mass reductions of the above described samples were measured were 500° C. (1.5 mg), 550° C. (1.0 mg), 600° C. (0.5 mg), 650° C. (0.2 mg) and 700° C. (0.1 mg), respectively.

At this time, a time change (reaction rate change dX/dt) of the weight loss due to the oxidization of the char in the above described thermal balance can be expressed by the following expression (2).

$$dX/dt = k(1-X)n\ P_{O_2}m \quad (2)$$

Here, k represents a reaction velocity (1/s·Pa) of char, X represents a reaction rate of char, $P_{O_2}$ represents a partial pressure (Pa) of oxygen, and m and n represent orders of the reaction.

If the above described orders of the reaction have been determined to be n=0 and m=1 (which are determined by another prediction experiment), $k=(dX/dt)/P_{O_2}$, and accordingly a value obtained by dividing the inclinations of tangents in the time change of the weight loss in the cases of unburned ratios of 0.3, 0.5 and 0.7 (though in the figure, the case of 0.5 is illustrated) by the measured partial pressure of oxygen shall be the reaction velocity k of char at the temperature T.

Next, the above described measurement and the like were conducted at each of the above described temperatures (K), and the Arrhenius plot was drawn which sets 1/T (1/K) for the horizontal axis and sets the reaction velocity k of char for the vertical axis. Then, the above described activation energy E was determined from the inclination of the Arrhenius plot and the reaction frequency factor A of char was determined from the intercept of the vertical axis, for each of the unburned ratios 0.3, 0.5 and 0.7 (though in the figure, the case of 0.5 is illustrated). Then, the average value of the reaction frequency factors A of char, which had been determined for each of the unburned ratios 0.3, 0.5 and 0.7, was determined to be the frequency factor A of the measured sample.

Figure 5:
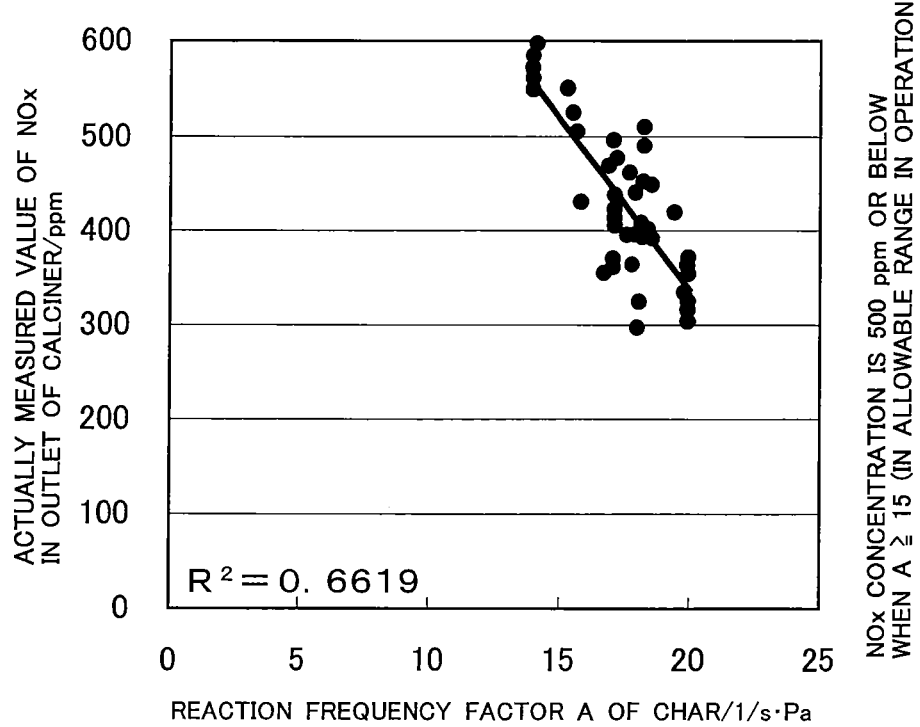
FIG. 5 is a graph illustrating a relationship between the reaction frequency factor of char of the pulverized coal and the NOx concentration in the exhaust gas, which has been determined in the present embodiment.

Subsequently, a relationship was determined between the reaction frequency factor A of char of the pulverized coal which was actually used in the calciner 12 and the NOx concentration in the exhaust gas discharged at that time. FIG. 5 is a graph illustrating this relationship. It is understood that there is a strong correlationship between the frequency factor and the NOx concentration.

In addition, it is understood that in order to control the NOx concentration to 500 ppm or below which is an allowable range in the operation of the above described calciner 12, the pulverized coal may be blended so that the reaction frequency factor A of char becomes 15 or more.

Figure 2:
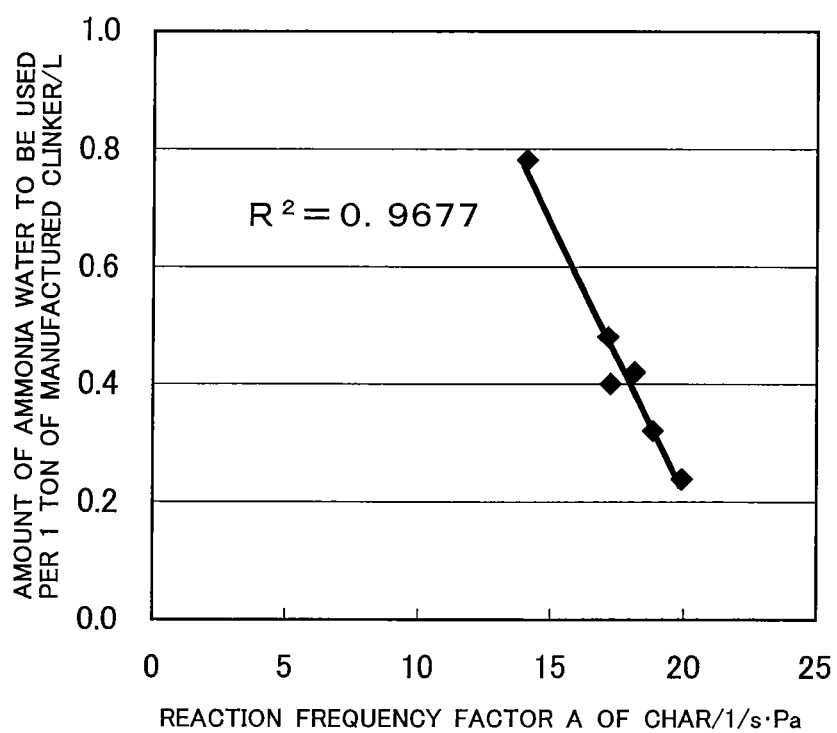
FIG. 2 is a graph illustrating a relationship between the reaction frequency factor of char, which has been determined in the above described embodiment, and a necessary amount of ammonia water to be used.

Furthermore, when ammonia water or the like is finally added to a gas including an exhaust gas to be discharged from the rotary kiln 1, the amount of ammonia water or the like to be used can be predicted as is illustrated in FIG. 2.

Thus, the method for controlling the NOx concentration in the exhaust gas in the calciner 12 which has the above described structure and uses the pulverized coal therein can easily control the NOx concentration in the exhaust gas to be discharged from the calciner 12 to such a value as to be within an allowable range in the operation of the calciner 12, by blending a plurality of types of the pulverized coals which are used in the calciner 12 so that the reaction frequency factor of char of the blend becomes the value of the reaction frequency factor A of char at which the NOx concentration becomes the target value or below, on the basis of the relationship between the reaction frequency factor A of char and the NOx concentration, which is illustrated in FIG. 5. Incidentally, the reaction velocity k of char and the reaction frequency factor A after the blending can be practically determined without problems by the weighted average of each value of the blended pulverized coals in consideration of the blend ratio, in addition to actual measurement.

In addition, the method can prevent also such an operational problem from occurring that the quality is lowered and a quantity of production is reduced, which originates in excessively lowering the temperature in the rotary kiln 1 so as to lower the NOx concentration in the exhaust gas that is discharged from the exhaust line 9, by controlling the NOx concentration in the calciner 12 to be within the allowable range in the operation. In addition, it also becomes possible to reduce the amount of ammonia water which is finally added to a gas including the exhaust gas from the rotary kiln 1, in the exhaust line 9.

INDUSTRIAL APPLICABILITY

The method of controlling an NOx concentration in the exhaust gas to be discharged from a fuel facility which uses a pulverized coal as a fuel, on the basis of the properties of the pulverized coal beforehand, can easily control the NOx concentration to or below a regulation value according to the Air Pollution Control Law and the like, and can also reduce an amount of the denitrifying agent or the like to be used, which is necessary for the control.

EXPLANATION OF REFERENCE NUMERALS 12 calciner (combustion facility)

The invention claimed is:

1. A method for controlling an NOx concentration in an exhaust gas in a combustion facility that uses a pulverized coal as a fuel, comprising in the following order:
  measuring a reaction velocity of each of a plurality of chars represented by $k_i$ and corresponding to a plurality of types of pulverized coals;
  determining a relationship between the NOx concentration in the exhaust gas and a reaction frequency factor, which is represented by $A_i$, of the reaction velocity $k_i$ for the each of the chars in the plurality of chars;
  blending the plurality of the types of the pulverized coal, to obtain a blended pulverized coal, wherein a blending ratio of the plurality of the types of the pulverized coal is determined by using, as an index, a reaction frequency factor of the char of the blended pulverized coal, which is represented by $A_{blend}$ and which corresponds to a target NOx concentration or below, on the basis of the relationship;
  supplying the blended pulverized coal to the combustion facility as the fuel of the combustion facility;
  wherein the reaction frequency factor for the each of the plurality of the chars, $A_i$, is determined by:
  drawing a curve of a time change of weight loss for the each of the plurality of the types of the pulverized coals under the condition of a plurality of temperatures by using a thermal balance;
  dividing inclination of a tangent of the curve by a measured partial pressure of oxygen, thereby determining the reaction velocity of the each of the plurality of the chars, $k_i$ at the respective temperatures;
  subsequently drawing an Arrhenius plot which sets (1/measurement temperature) for the horizontal axis and sets a value of the reaction velocity of the char, $k_i$, in the measurement temperature for the vertical axis; and
  determining the reaction frequency factor for the each of the plurality of the chars, $A_i$, from an intercept of the vertical axis of the Arrhenius plot.

* * * * *